(12) United States Patent
Vohra et al.

(10) Patent No.: US 9,595,014 B1
(45) Date of Patent: Mar. 14, 2017

(54) SYSTEM AND METHOD FOR EXECUTING WORKFLOW INSTANCE AND MODIFYING SAME DURING EXECUTION

(75) Inventors: Sandeep Vohra, Trophy Club, TX (US); Hyder Alkasimi, Flower Mound, TX (US); Richard Velasquez, Keller, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 572 days.

(21) Appl. No.: 13/241,502

(22) Filed: Sep. 23, 2011

Related U.S. Application Data

(60) Provisional application No. 61/386,395, filed on Sep. 24, 2010.

(51) Int. Cl.
*G06Q 10/06* (2012.01)
*G06Q 10/00* (2012.01)
*G06Q 10/10* (2012.01)

(52) U.S. Cl.
CPC ............. *G06Q 10/06* (2013.01); *G06Q 10/10* (2013.01)

(58) Field of Classification Search
CPC ............................... G06Q 10/06; G06Q 10/10
USPC .................... 705/7, 8, 9, 7.27, 7.15
See application file for complete search history.

(56) References Cited

U.S. PATENT DOCUMENTS

| 2003/0117417 | A1 | 6/2003 | Lee | |
|---|---|---|---|---|
| 2006/0069605 | A1* | 3/2006 | Hatoun | G06Q 10/06 705/7.15 |
| 2006/0074714 | A1* | 4/2006 | Aziz | G06Q 10/06 705/2 |
| 2011/0307856 | A1* | 12/2011 | Klaka | G06Q 10/06 717/104 |

OTHER PUBLICATIONS

How to: Apply Workflow Changes to Workflows; Microsoft Corporation, 2010; www.msdn.microsoft.com/en-us/library/ms734569(VS.90,printer).aspx.
Ingo Wassink et al.; Designing Workflows on the Fly Using e-BioFlow; Lecture Notes in Computer Science, 2009, vol. 5900/2009, Abstract; www.springerlink.com/content/1660n17463872507/.

* cited by examiner

*Primary Examiner* — Nga B. Nguyen
(74) *Attorney, Agent, or Firm* — Haynes and Boone LLP

(57) ABSTRACT

A system and method according to which a workflow instance is modified during the execution thereof. In several exemplary embodiments, the workflow instance is an automated business process and the modifier of the workflow instance is a client user, such as a business user or analyst. In several exemplary embodiments, the workflow instance may be directed to assigning airline flights for crew members, routing aircraft, generating airline flight numbers, assigning airline flights for equipment, or any combination thereof.

2 Claims, 15 Drawing Sheets

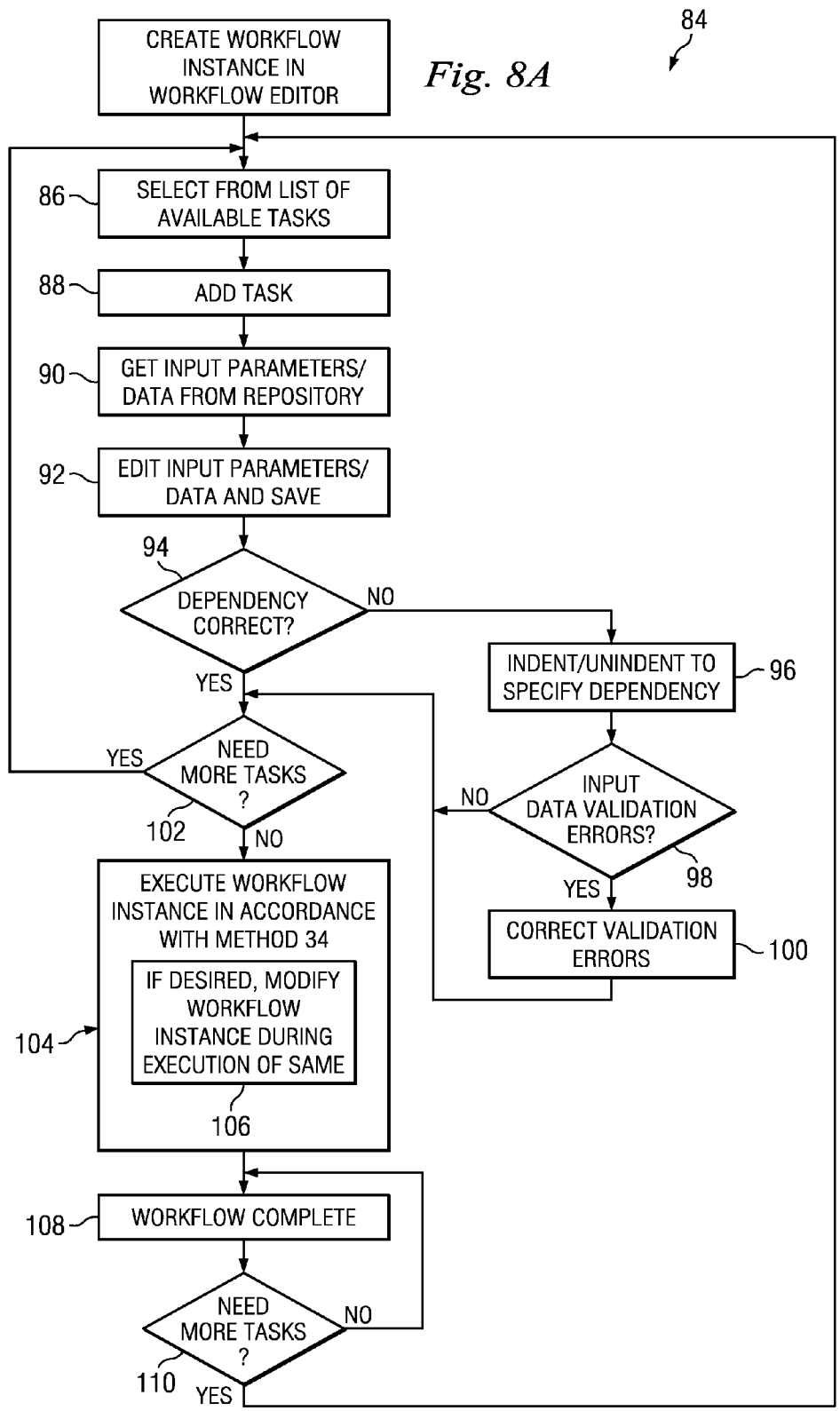

SYSTEM AND METHOD FOR EXECUTING WORKFLOW INSTANCE AND MODIFYING SAME DURING EXECUTION

CROSS-REFERENCE TO RELATED APPLICATION

This application claims the benefit of the filing date of U.S. provisional patent application No. 61/386,395, filed Sep. 24, 2010, the entire disclosure of which is incorporated herein by reference.

BACKGROUND

The present disclosure relates in general to automated processes, or workflows, and in particular to a system and method for modifying a workflow instance on the fly, that is, during the execution of the workflow instance. In several exemplary embodiments, the workflow instance is an automated business process and the modifier of the workflow instance is a client user, such as a business user or analyst. In several exemplary embodiments, the workflow instance may be directed to assigning airline flights for crew members, routing aircraft, generating airline flight numbers, assigning airline flights for equipment, or any combination thereof.

BRIEF DESCRIPTION OF THE DRAWINGS

FIG. 8A is a flow chart illustration of a method of creating and/or modifying the workflow instance of FIG. 6 by implementing in whole or in part the system of FIGS. 1-4, according to an exemplary embodiment.

DETAILED DESCRIPTION

Figure 1:
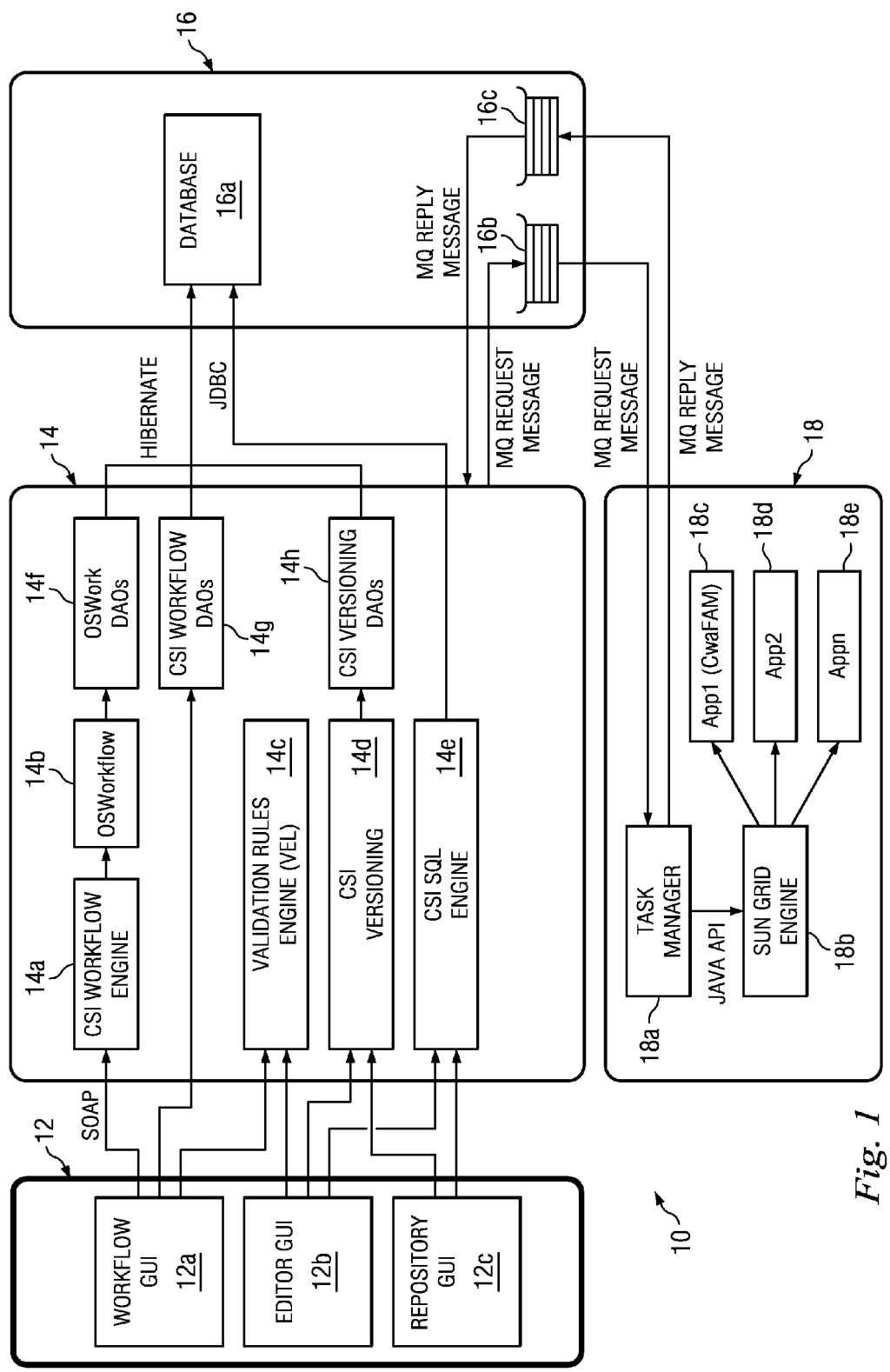
FIG. 1 is a diagrammatic illustration of a system according to an exemplary embodiment, the system including an editor module, an engine module, a database module, and a task module.

In an exemplary embodiment, as illustrated in FIG. 1, a system is generally referred to by the reference numeral 10 and includes an editor module 12, an engine module 14, a database module 16, and a task module 18. The editor module 12 includes a workflow graphical user interface (GUI) 12a, an editor GUI 12b, and a repository GUI 12c. The engine module 14 includes a workflow engine 14a, a workflow library module 14b, a validation rules engine 14c, a versioning engine 14d, a structured query language (SQL) engine 14e, and data access objects (DAOs) 14f, 14g and 14h. The engine module 14 is operably coupled to, and in communication with, the database module 16. In an exemplary embodiment, the engine module 14 is operably coupled to, and in communication with, each of the database module 16 and the task module 18. The database module 16 includes a database 16a, a request message queue 16b, and a reply message queue 16c. The database module 16 is operably coupled to, and in communication with, the task module 18. The task module 18 includes a task manager module 18a, a Sun Grid Engine (SGE) 18b, and applications 18c, 18d and 18e. In an exemplary embodiment, instead of, or in addition to the SGE 18b, the system 10 may include one or more other schedulers/load balancers.

As shown in FIG. 1, in an exemplary embodiment, the workflow GUI 12a is in communication with the workflow engine 14a via SOAP architecture. The workflow GUI 12a is also in communication with each of the validation rules engine 14c and the DAO 14g. The editor GUI 12b is in communication with each of the validation rules engine 14c, the versioning engine 14d, and the SQL engine 14e. The repository GUI 12c is in communication with each of the versioning engine 14d and the SQL engine 14e. The workflow engine 14a is in communication with the workflow library module 14b, which is in communication with the DAO 14f. The versioning engine 14d is in communication with the DAO 14h. The DAOs 14f, 14g and 14h are in communication with the database 16a via an object-relational mapping (ORM) library, such as Hibernate. The SQL engine 14e is in communication with the database 16a via an application programming interface (API), such as Java Database Connectivity (JDBC). The engine module 14 is in communication with the request message queue 16b, and the reply message queue 16c is in communication with the engine module 14. The request message queue 16b is in communication with the task manager module 18a, which is in communication with the reply message queue 16c. The task manager module 18a is in communication with the SGE 18b via a Java API. The SGE 18b is in communication with each of the applications 18c, 18d and 18e.

Figure 2:
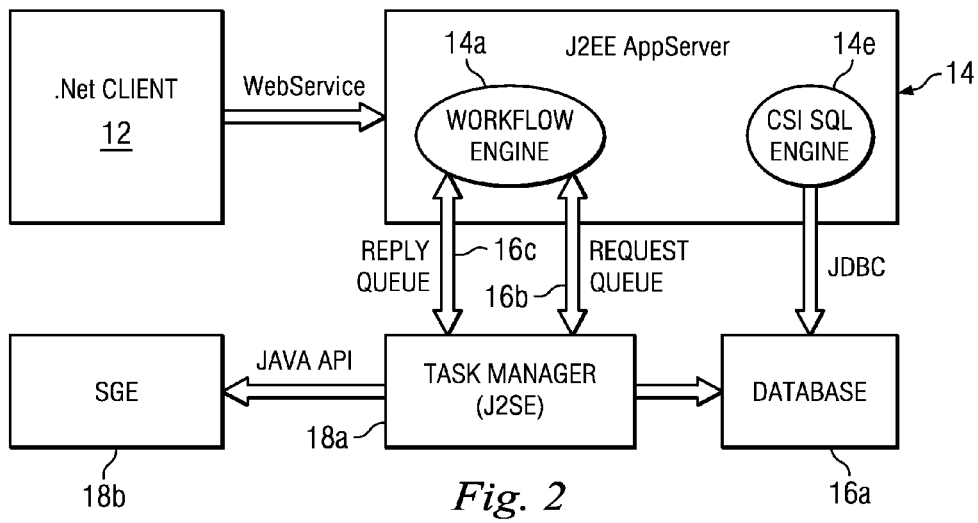
FIG. 2 is a diagrammatic illustration of a portion of the system of FIG. 1, according to an exemplary embodiment.

In an exemplary embodiment, as illustrated in FIG. 2 with continuing reference to FIG. 1, the editor module 12 is or includes a .Net client, which is in communication with the engine module 14 via a Web service. The engine module 14 is, includes, or is part of, an application server, such as a Java 2 Platform, Enterprise Edition (J2EE) application server. The workflow engine 14a is in communication with the task manager module 18a via each of the request message queue 16b and the reply message queue 16c. The task manager module 18a uses the Java 2 Platform, Standard Edition (J2SE). The task manager module 18a is in communication with the SGE 18b via a Java API. The task manager module 18a and the SQL engine 14e are in communication with the database 16a.

Figure 3:
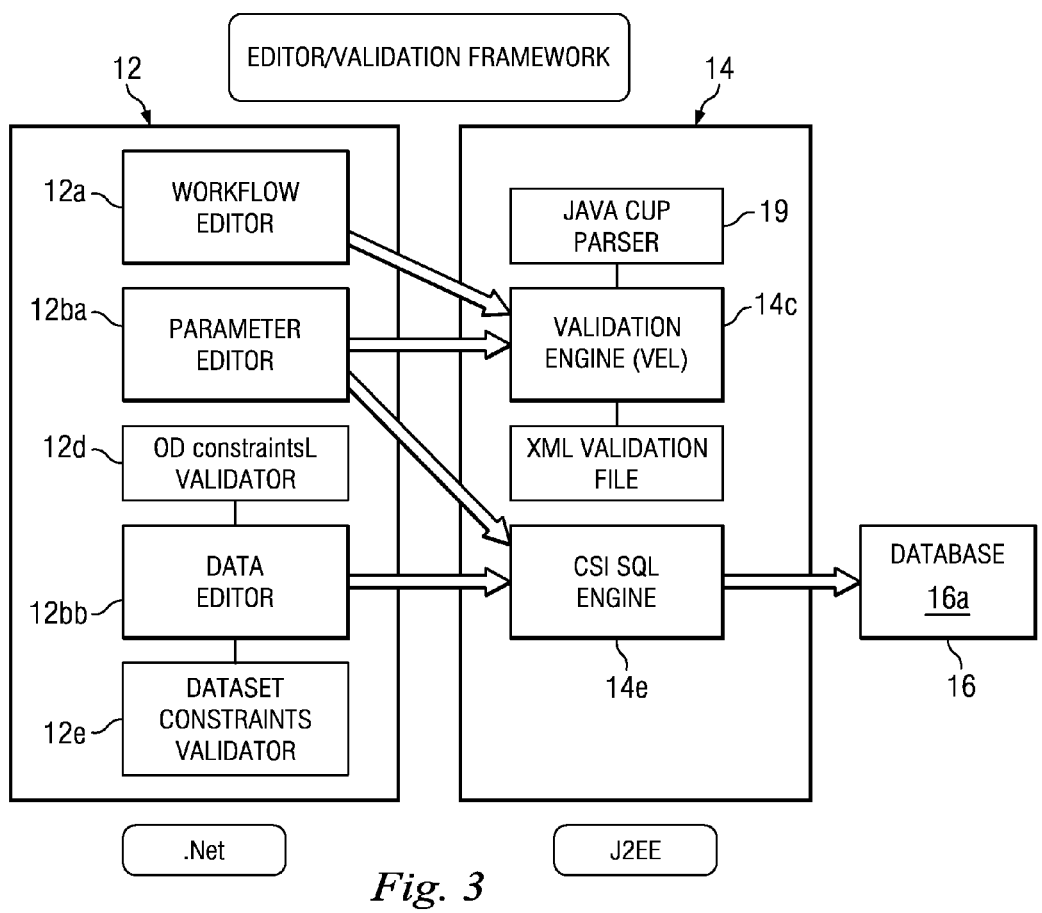
FIG. 3 is a diagrammatic illustration of another portion of the system of FIG. 1, according to an exemplary embodiment.

In an exemplary embodiment, as illustrated in FIG. 3 with continuing reference with FIGS. 1 and 2, the editor GUI 12b includes a parameter editor 12ba and a data editor 12bb. The parameter editor 12ba is in communication with the validation engine 14c and the SQL engine 14e. The data editor 12bb interfaces with an OD constraints validator 12d and a dataset constraints validator 12e. The data editor 12bb is in communication with the SQL engine 14e, which is in communication with the database 16a. The validation engine 14c interfaces with a Java cup parser 19.

Figure 4:
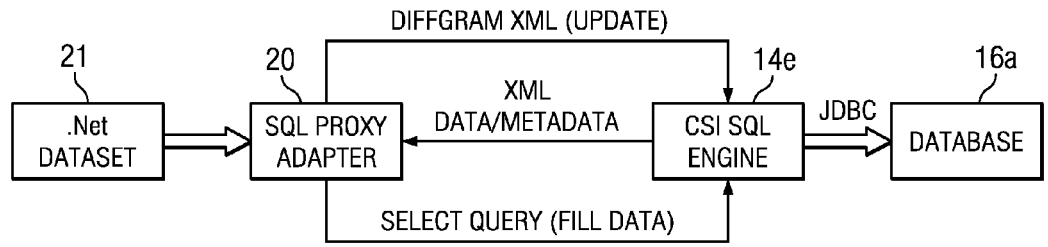
FIG. 4 is a diagrammatic illustration of yet another portion of the system of FIG. 1, according to an exemplary embodiment.

In an exemplary embodiment, as illustrated in FIG. 4 with continuing reference with FIGS. 1, 2 and 3, the system 10 further includes an SQL proxy adapter 20, which receives a dataset 21 from the editor module 12 and interfaces with the SQL engine 14e.

Figure 5:
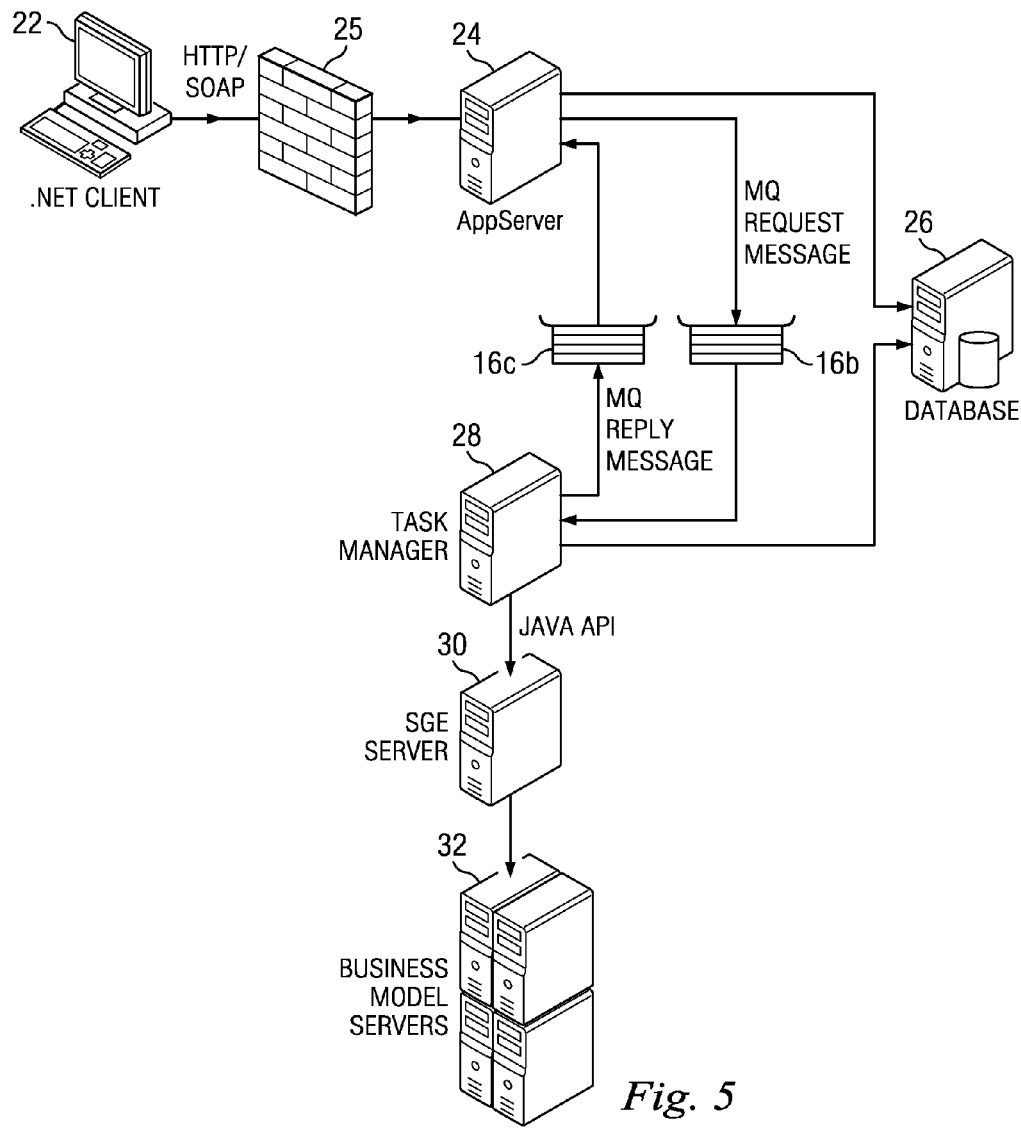
FIG. 5 is a diagrammatic illustration of architecture for implementing in whole or in part the system of FIGS. 1-4, according to an exemplary embodiment.

In an exemplary embodiment, as illustrated in FIG. 5 with continuing reference to FIGS. 1-4, the system 10 includes, and/or is implemented with, one or more computers, hardware and/or software systems, application servers, application platforms, and/or any combination thereof. For example, the editor module 12 may include or use a client computer 22. The engine module 14 may include or use an application server 24. A firewall 25 may be used between the client computer 22 and the application server 24. The database module 16 may include or use a database server 26. The task manager module 18a of the task module 18 may include or use a task manager server 28. The SGE 18b of the task module 18 may include or use an SGE server 30. The applications 18c, 18d and 18e of the task module 18 may include or use one or more business model servers 32.

Figure 6:
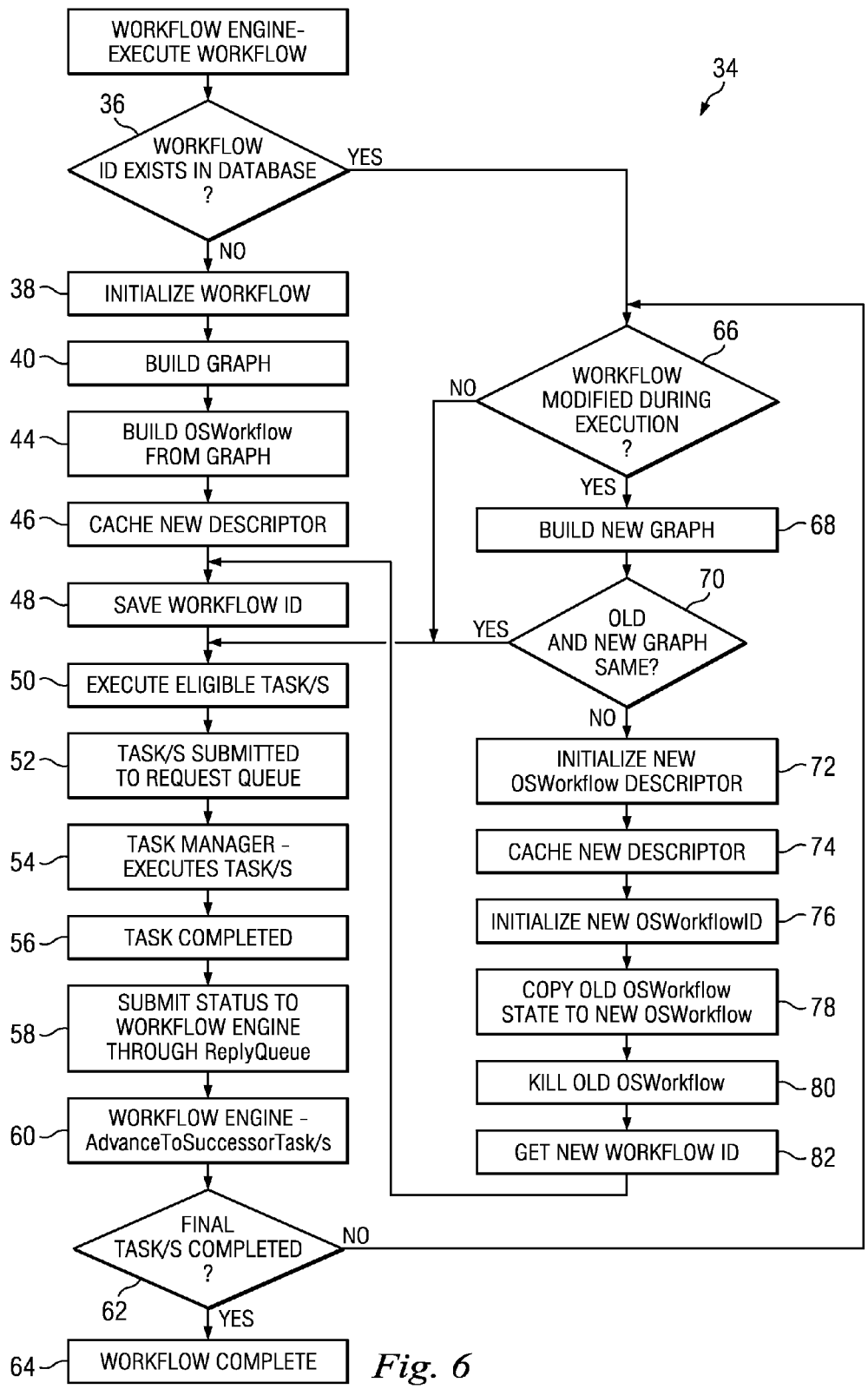
FIG. 6 is a flow chart illustration of a method of executing a workflow instance by implementing in whole or in part the system of FIGS. 1-4, according to an exemplary embodiment.
Figure 7:
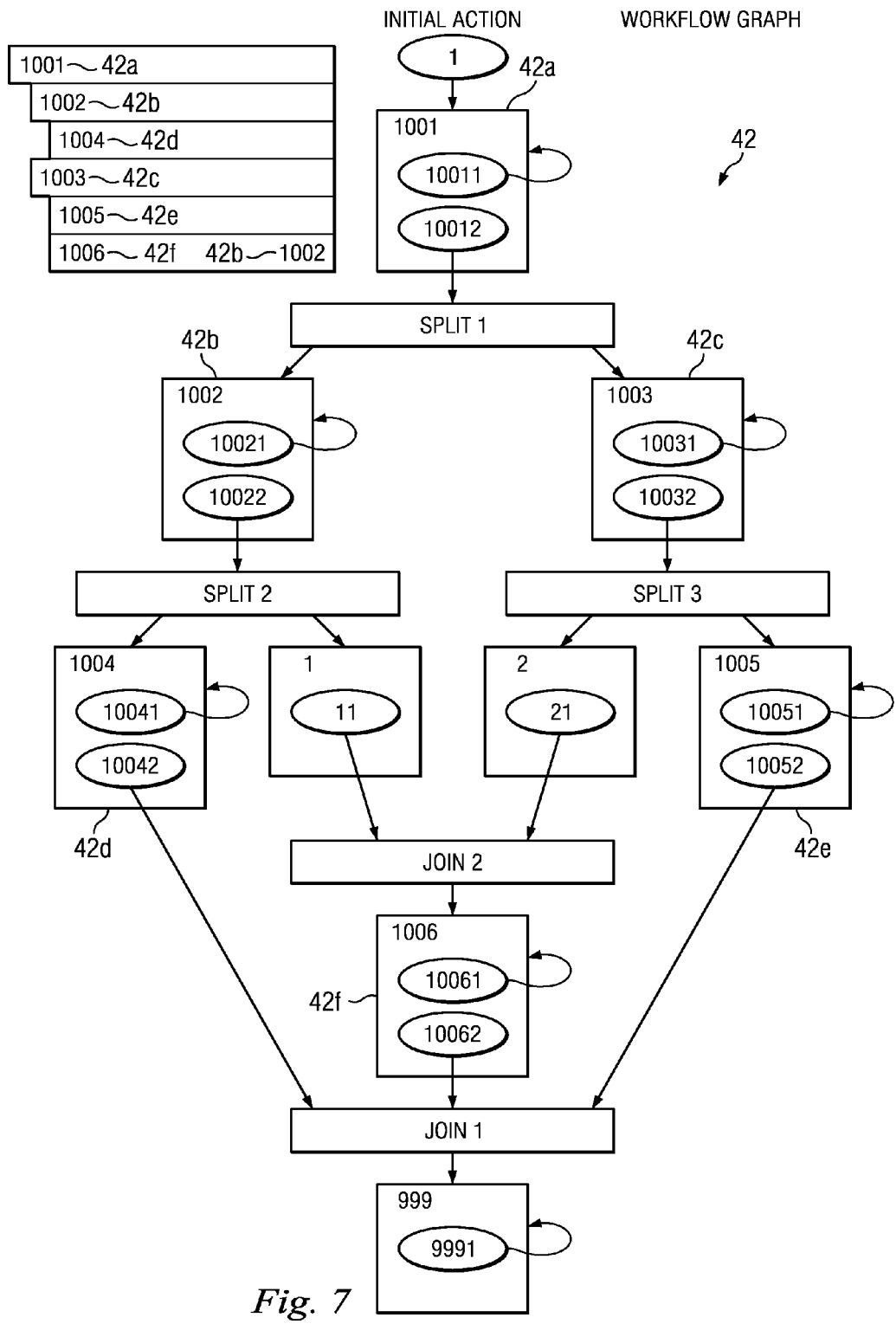
FIG. 7 is a diagrammatic illustration of a graph built during the execution of the method of FIG. 6, according to an exemplary embodiment.

In an exemplary embodiment, as illustrated in FIGS. 6 and 7 with continuing reference to FIGS. 1-5, a method of executing a workflow instance is generally referred to by the reference numeral 34. In several exemplary embodiments, the method 34 is implemented using the system 10 and/or one or more components thereof. In an exemplary embodiment, the execution of a workflow instance refers to the execution of an automated process such as, for example, an automated business process. The workflow includes a plurality of steps or tasks, including initial task(s). In an exemplary embodiment, if the workflow is an automated business process, each task may represent, or include in whole or in part, a business model. A particular execution of the workflow may be referred to as a workflow instance. At any given time during the execution of the workflow instance, tasks that are currently being executed may be referred to as current tasks, tasks that have already been completed during the execution of the workflow instance may be referred to as predecessor tasks, and tasks that have yet to be completed during the execution of the workflow instance may be referred to as successor tasks. Each of the tasks may be independent of any other task, or may be dependent upon one or more other tasks. The following description of the method 34 contemplates that a complete workflow has already been generated using, for example, at least the editor module 12 including the GUIs 12a, 12b and 12c, the validation rules engine 14c, the versioning engine 14d, the SQL engine 14e, and the database module 16 including the database 16a. In several exemplary embodiments, the method 34 is automatically executed in response to a trigger event, such as a request by a client, or business user or business analyst, via the editor module 12.

As shown in FIG. 6, the method 34 includes step 36, at which it is determined whether a workflow identifier exists in the database 16a. If the workflow is new and an instance thereof has never been executed before, no workflow identifier exists in the database 16a, and the workflow is initialized at step 38. At step 40, a graph 42 based on the workflow is automatically built.

An example of the graph 42 is shown in FIG. 7. The graph 42 includes at least tasks 42a, 42b, 42c, 42d, 42e and 42f. The tasks 42b and 42c are dependent upon the task 42a. The task 42d is dependent upon the task 42b. The task 42e is dependent upon the task 42c. The task 42f is dependent upon the task 42b and the task 42c.

Referring back to FIG. 6, after the graph 42 is built at the step 40, an input for a workflow library is created at step 44 and the initial workflow is built. As a result, a descriptor is initialized for the workflow at the step 44. The descriptor initialized at the step 44 is based on the graph 42, and is formatted for a particular workflow system such as, for example, OSWorkflow. The descriptor initialized at the step 44 describes all of the steps, states, transitions and functionality for the workflow. In an exemplary embodiment, the descriptor initialized at the step 44 is or includes an Extensible Markup Language (XML) file. The descriptor is cached at step 46, and an identifier for the workflow is initialized and saved at step 48. Eligible tasks are then executed by the workflow engine 14a at step 50. A single task or multiple tasks may be executed at the step 50. The task(s) are then submitted to the request queue 16b at step 52. In several exemplary embodiments, the steps 36, 38, 40, 44, 46, 48, 50 and 52 are executed in whole or in part by the workflow engine 14a.

At step 54, the task manager module 18a executes the task(s), and the task(s) are completed at step 56. At step 58, a status message indicating that the task(s) have been completed is sent to the workflow engine 14a via the reply queue 16c. The workflow engine 14a then advances to successor task(s) at step 60. At step 62, it is determined whether the task(s) that were completed at the step 56 were the final task(s) in the workflow. In an exemplary embodiment, the step 62 is executed by determining whether the successor task(s) advanced by the workflow engine 14a are "dummy" or placeholder task(s), which indicate that the workflow has been completed. If so, then the execution of the workflow instance is completed at step 64.

If it is determined at the step 62 that the task(s) that were completed at the step 56 were not the final task(s) of the workflow, then it is automatically determined at step 66 whether the workflow has been changed on the fly, that is, during the execution of the workflow instance. The workflow can be changed by, for example, modifying existing task(s), adding new task(s), deleting task(s), rearranging task(s), and/or any combination thereof. In an exemplary embodiment, the workflow can be changed during the execution of the workflow instance by a client user, such as a business user or business analyst; the client user may use the editor module 12 to change the workflow during the execution of the workflow instance, as will be described in further detail below in connection with FIGS. 8A and 8B.

If it is automatically determined at the step 66 that the workflow has not been changed during the execution of the workflow instance, then the steps 50, 52, 54, 56 and 58 are repeated with the successor task(s), in accordance with the foregoing, followed by the steps 60 and 62 and then either the step 64 or the step 66.

If it is automatically determined at the step 66 that the workflow has been changed during the execution of the workflow instance, then a new graph is built at step 68, with the new graph including the predecessor tasks but reflecting the changes to the workflow. The graph built at the step 40 and the graph built at the step 68 are compared to each other at step 70, and it is determined whether the structures of the graphs are the same at the step 70. For example, at the step 70, if only data edits have been made to the workflow, the structure is the same. However, the structure is not the same if new tasks have been added to the workflow, tasks have been deleted from the workflow, dependencies among the tasks have changed, etc.

If it is determined at the step 70 that the structure of the graphs are the same, then the steps 50, 52, 54, 56 and 58 are repeated with the successor task(s), in accordance with the foregoing, followed by the steps 60 and 62, and the step(s) subsequent thereto as applicable.

If it is determined at the step 70 that the structure of the graphs are not the same, then a new input for a workflow library is created at step 72 and the new or modified workflow is built. As a result, a new descriptor is initialized for the modified workflow at the step 72. The new descriptor initialized at the step 72 is based on the new graph built at the step 68. The new descriptor describes all of the steps, states, transitions and functionality for the workflow as modified on the fly, that is, during the execution of the workflow instance. In an exemplary embodiment, the new descriptor initialized at the step 72 is or includes an XML file. The new descriptor is cached at step 74, and an identifier for the workflow is initialized and saved at step 76.

At step 78, the state of the old workflow is copied to the new (or modified) workflow. More particularly, data corresponding to the predecessor (or completed) tasks is retrieved from, for example, the database 16a. The successor (or to be completed) tasks in the modified workflow are revised in accordance with the data corresponding to the predecessor tasks. For example, if the successor tasks are dependent upon the predecessor tasks, the data and/or parameters of the dependent successor tasks are updated accordingly. The predecessor tasks are then removed from the new (or modified) workflow.

At step 80, the old workflow is killed or otherwise rendered inapplicable. A new workflow identifier is obtained for the new workflow at step 82, and the new workflow identifier is saved at the step 48. The steps 50, 52, 54, 56, 58, 60 and 62 are then repeated using the new workflow, along with the step(s) subsequent thereto as applicable.

If it is determined at the step 36 that a workflow identifier exists in the database 16a, then the step 66 is automatically executed, as well as the steps of the method 34 subsequent to the step 66 as applicable.

In several exemplary embodiments, two or more of the steps of the method 34 are executed simultaneously, in parallel, etc. In an exemplary embodiment, one or more of the steps of the method 34 are executed during the execution of one or more other of the steps of the method 34. In an exemplary embodiment, one or more of the steps 60, 62, 66, 68, 70, 72, 74, 76, 78, 80 and 82 are executed during the execution of one or more of the steps 50, 52, 54, 56 and 58. In an exemplary embodiment, after the step 50 but during one or more of the steps 52, 54, 56 and 58, the steps 60 and 62 are executed, followed by the execution of either the step 64 or, if necessary, the step 66 and the steps subsequent thereto. In an exemplary embodiment, the execution of the step 64 occurs after the steps 50, 52, 54, 56 and 58 have been completed. In an exemplary embodiment, the execution of the step 66 and one or more of the steps subsequent thereto occur during one or more of the steps 50, 52, 54, 56 and 58.

In view of the foregoing, it is clear that the method 34 enables repeated modification of the workflow instance during the execution of the workflow instance. The workflow can be changed while the workflow instance is executing. Business processes can be added or removed from a particular workflow instance while that workflow instance is executing. This provides enormous flexibility to business users and analysts, who can modify pending tasks in a workflow instance run without interrupting the run. New tasks or changes to not yet run tasks automatically become part of the running workflow instance. The workflow instance in execution does not need to be interrupted while changes are made to the workflow. The execution of the workflow instance is not suspended or made idle while changes are made to the workflow.

In an exemplary embodiment, as illustrated in FIG. 8A with continuing reference to FIGS. 1-7, a method of using the editor module 12 to create and/or modify a workflow and thus a workflow instance is generally referred to by the reference numeral 84.

To create a workflow instance in accordance with the method 84, a task is selected from a list of available tasks at step 86, and the selected task is added to the workflow at step 88. In an exemplary embodiment, the steps 86 and 88 are executed using the workflow GUI 12a. At step 90, input parameters and/or data are obtained from a repository, which may be stored in the database module 16 and/or part of the database 16a. In an exemplary embodiment, the input parameters and/or data are obtained using the repository GUI 12c. The input data and/or parameters are edited and saved at step 92. In an exemplary embodiment, the input data and/or parameters are edited and saved using the editor GUI 12b. At step 94, it is determined whether any and all dependencies between the added tasks are correct and, if not, the correct dependencies are specified at step 96. In an exemplary embodiment, the correct dependencies are specified in the step 96 using the editor GUI 12b. For example, the client user may use the editor GUI 12b to indent task(s) to specify that the indented task(s) are dependent upon task(s) that are either not indented or indented to a lesser degree, as shown in, for example, FIG. 7. Conversely, the client user may use the GUI 12b to un-indent task(s) to remove dependencies.

At step 98, it is determined whether there are any input validation errors. If so, the validation errors are corrected at step 100. In an exemplary embodiment, the validation rules engine 14c determines whether there are any input validation errors at the step 98. In an exemplary embodiment, the validation errors are corrected at the step 100 by the client user via one or more of the workflow GUI 12a, the editor GUI 12b and the repository GUI 12c. In an exemplary embodiment, a validation expression language is used to specify validation rules external to Java code in order to validate dependencies of tasks in the workflow, along with inputs, parameters and outputs of the tasks.

After the step 100, or if it is determined at the step 98 that there are no validation errors, then it is determined at step 102 whether additional tasks are needed. If so, then the steps 86, 88, 90, 92, 94 are repeated, as well as one or more of the steps 96, 98 and 100 as necessary.

If it is determined at the step 102 that additional tasks are not needed, then the workflow instance is executed at step 104. The workflow instance is executed at the step 104 in accordance with the method 34. In an exemplary embodiment, the client user initiates the execution of the workflow instance by inputting a request using the workflow GUI 12a. In an exemplary embodiment, the workflow instance is executed in the step 104 in response to a trigger event such as, for example, a request by the client user via the module 12, an express or inferred event, or an expiration of a predetermined time period. In response to the trigger event of the client user initiating the execution of the workflow instance at the step 104, the workflow instance is automatically executed in accordance with the method 34 of FIG. 6.

In several exemplary embodiments, the client may decide to modify the workflow instance during the execution thereof. If so, then during the execution of the workflow instance at the step 104, the workflow instance is modified at step 106 without interrupting the execution of the workflow instance. In several exemplary embodiments, since the workflow instance is being executed in accordance with the method 34, the modification of the workflow instance during the execution of same at the step 106 is automatically detected at the step 66 of the method 34. In an exemplary embodiment, the workflow engine 14a automatically detects the foregoing modification to the workflow instance made at the step 106 during the execution of the workflow instance at the step 104, which execution is carried out in accordance with the method 34. More particularly, the workflow engine 14a automatically detects the foregoing modification at the step 66 of the method 34 of FIG. 6.

In an exemplary embodiment, after the execution of the workflow, the workflow is completed at step 108, which corresponds to the step 64 of the method 34. In several exemplary embodiments, after all desired modifications to the workflow instance have been made by the client user at the step 106 during the execution of the workflow instance at the step 104, or if no modifications have been made, then the execution of the workflow at the step 104 is ultimately completed and the client user may review the results thereof at step 108.

In an exemplary embodiment, after the step 108, it is determined at step 110 whether additional tasks are needed. If so, then at least the steps 86, 88, 90, 92, 94, 104 and 108 are repeated, as well as one or more of the steps 96, 98, 100 and 106 as necessary. Since the previous workflow instance has already been completed at the step 108, the step 104 must be repeated in order to execute the workflow instance incorporating any changes made as a result of the step 110. If it is determined at the step 110 that additional tasks are not needed, then the workflow remains completed at the step 108.

Figure 8B:
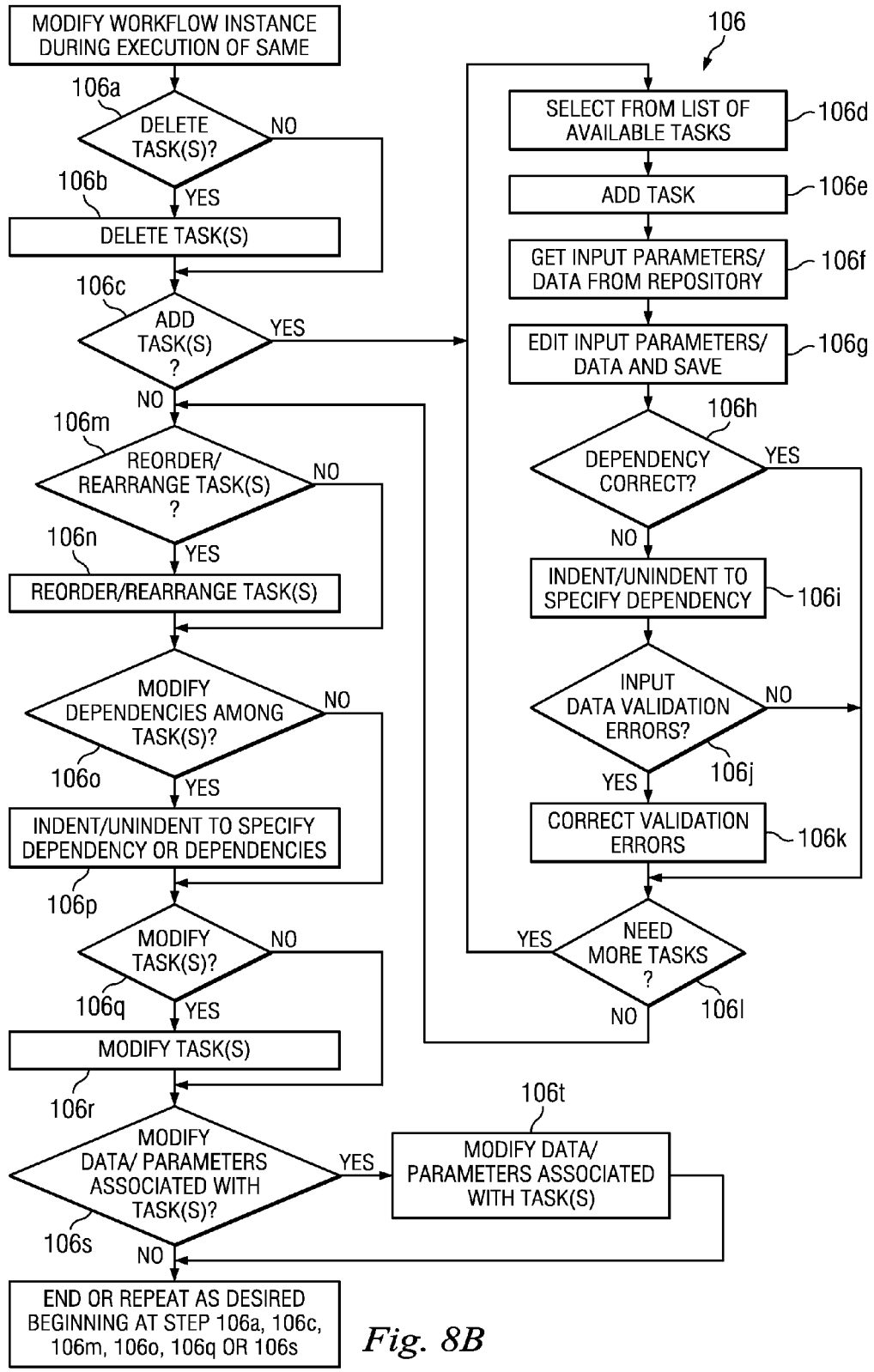
FIG. 8B is a flow chart illustration of a step of the method of FIG. 8A, according to an exemplary embodiment.

In an exemplary embodiment, as illustrated in FIG. 8B with continuing reference to FIGS. 1-8A, to modify the workflow instance at the step 106 of the method 84, it is determined at step 106a whether task(s) need to be deleted from the workflow instance. If so, then the task(s) are deleted at the step 106b. Before, during and/or after the step 106a, it is determined at step 106c whether task(s) need to be added to the workflow instance. If so, then steps 106d, 106e, 106f, 106g and 106h are executed. The steps 106d, 106e, 106f, 106g and 106h are identical to the steps 86, 88, 90, 92 and 94, respectively, of the method 84 and therefore will not be described in further detail. If it is determined at the step 106h that the dependencies are not correct, then steps 106i and 106j, and possibly step 106k, are executed. The steps 106i, 106j and 106k are identical to the steps 96, 98 and 100, respectively, of the method 84 and therefore will not be described in further detail. After the step 106h or the step 106k, step 106l is executed. The step 106l is identical to the step 102 of the method 84 and therefore will not be described in further detail. Before, during and/or after the step 106c, it is determined at step 106m whether the task(s) need to be reordered and/or rearranged. If so, then the task(s) are reordered and/or rearranged at step 106n. Before, during and/or after the step 106m, it is determined at step 106o whether the dependencies among the task(s) need to be modified. If so, then the dependencies among the task(s) are modified at step 106p. In an exemplary embodiment, after the step 106p, it is determined whether there are any input validation errors and, if so, the validation errors are corrected. Before, during and/or after the step 106o, it is determined at step 106q whether the task(s) themselves need to be modified. If so, then the task(s) themselves are modified at step 106r. Before, during and/or after the step 106q, it is determined at step 106s whether data and/or parameters associated with the task(s) need to be modified. If so, then the data and/or parameters are modified at step 106t.

In several exemplary embodiments, the step 106 may be repeated beginning at step 106a, 106c, 106m, 106o, 106q or 106s. In several exemplary embodiments, the step 106 and/or one or more steps thereof may be repeated as many times as desired, and/or executed simultaneously and/or sequentially.

In an exemplary embodiment, the step 106 is executed using the editor module 12, the workflow GUI 12a, the editor GUI 12b, the repository GUI 12c, the database module 16, the database 16a, and/or any combination thereof.

In several exemplary embodiments, the step 106 is executed during the step 104. The step 104 is not repeated because the workflow instance has already been initially executed and its execution has continued during the modification to the workflow instance at the step 106. As noted above, the workflow engine 14a automatically detects the foregoing modification to the workflow instance during the execution of the workflow instance in accordance with the method 34. More particularly, the workflow engine 14a automatically detects the foregoing modification at the step 66 of the method 34 of FIG. 6.

Figure 9:
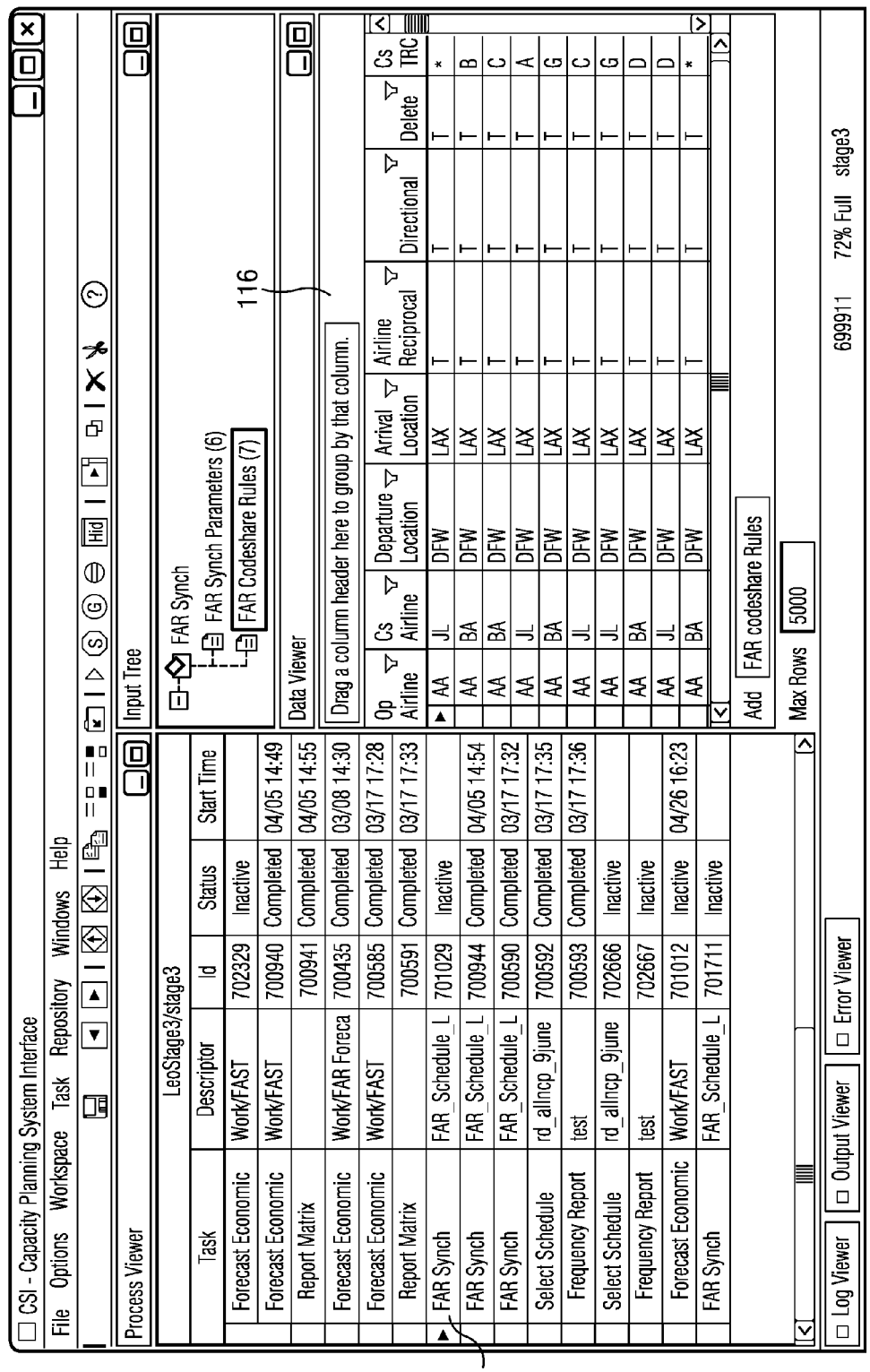
FIGS. 9-15 are diagrammatic illustrations of interfaces/output generated during the execution of the methods of FIG. 6 and/or FIG. 8A, according to respective exemplary embodiments.

In an exemplary embodiment, as illustrated in FIG. 9 with continuing reference to FIGS. 1-8, a spreadsheet-like editor 112 may be used to configure inputs for the different tasks of a worker. The spreadsheet-like editor 112 may include or be part of one or more of the workflow GUI 12a, the editor GUI 12b and the repository GUI 12c. The spreadsheet-like editor 112 may be executed using the module 12 and/or the client computer 22. As shown in FIG. 9, a task 114 represented in the editor 112 may be selected, and inputs and/or parameters associated with the task 114 may be edited with a viewer 116. The editor 112 and/or the viewer 116 may be used during one or more of the steps 86, 88, 90, 92, 94, 96, 98, 100, 102, 104 and 106.

Figure 10:
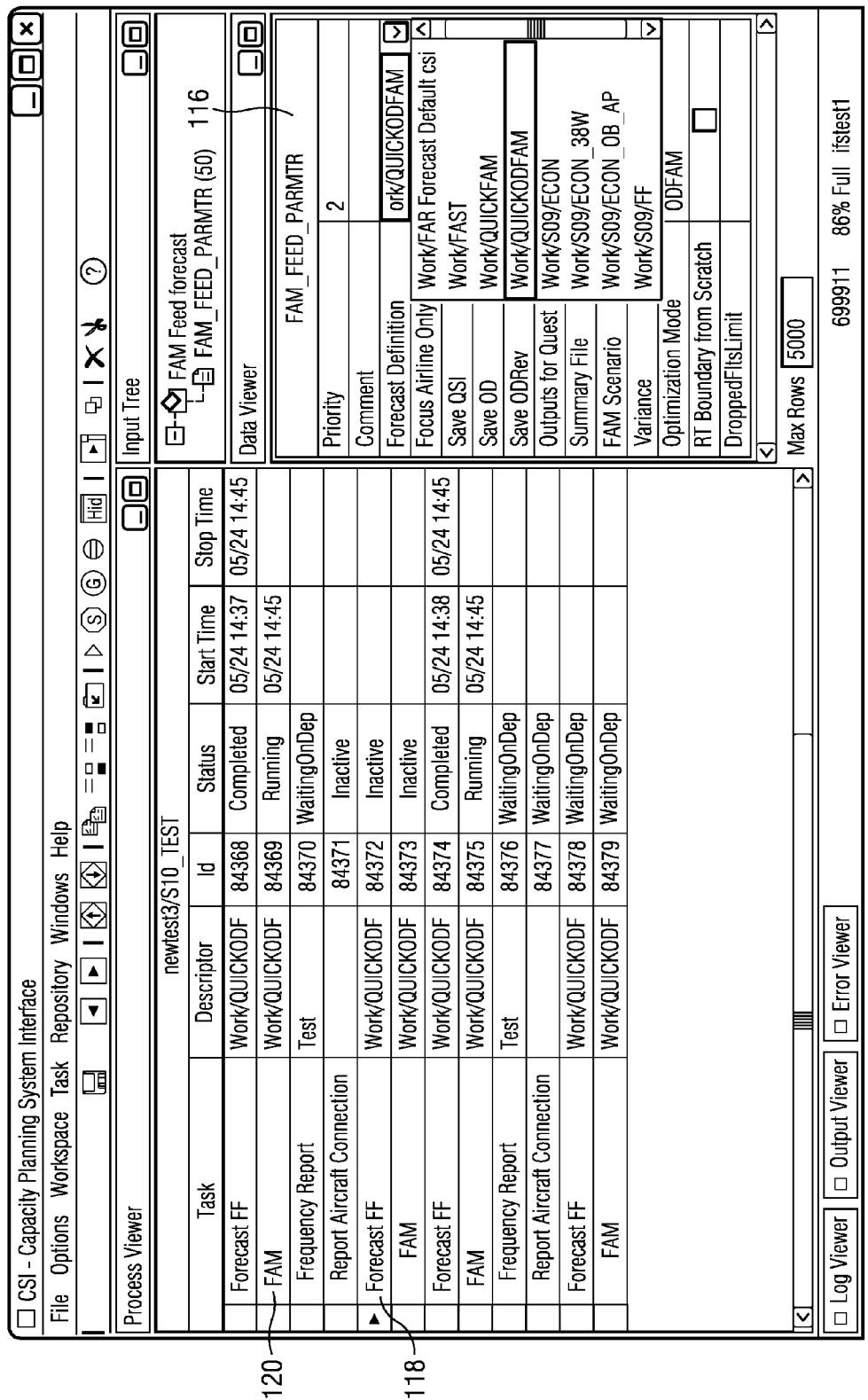

In an exemplary embodiment, as illustrated in FIG. 10 with continuing reference to FIGS. 1-9, a task 118 is edited with the viewer 116 during the execution of the workflow instance at the step 104 and thus the method 34. In particular, the task 118 is edited with the viewer 116 during the execution of a task 120 at the step 104 and thus the method 34.

Figure 11:
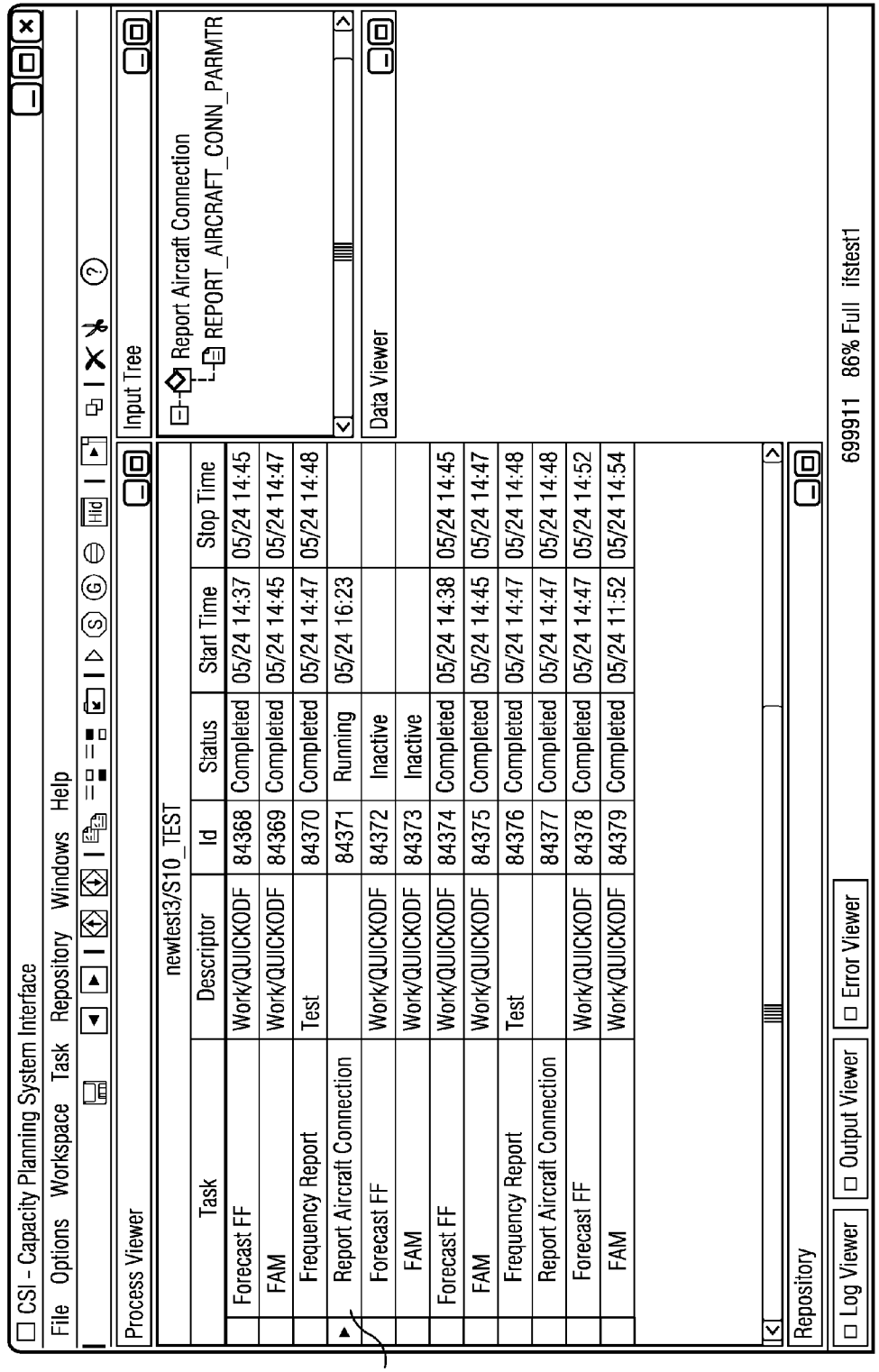

In an exemplary embodiment, as illustrated in FIG. 11 with continuing reference to FIGS. 1-10, the task 118 is executed after editing but still during the execution of the workflow instance at the step 104 and thus the method 34.

Figure 12:
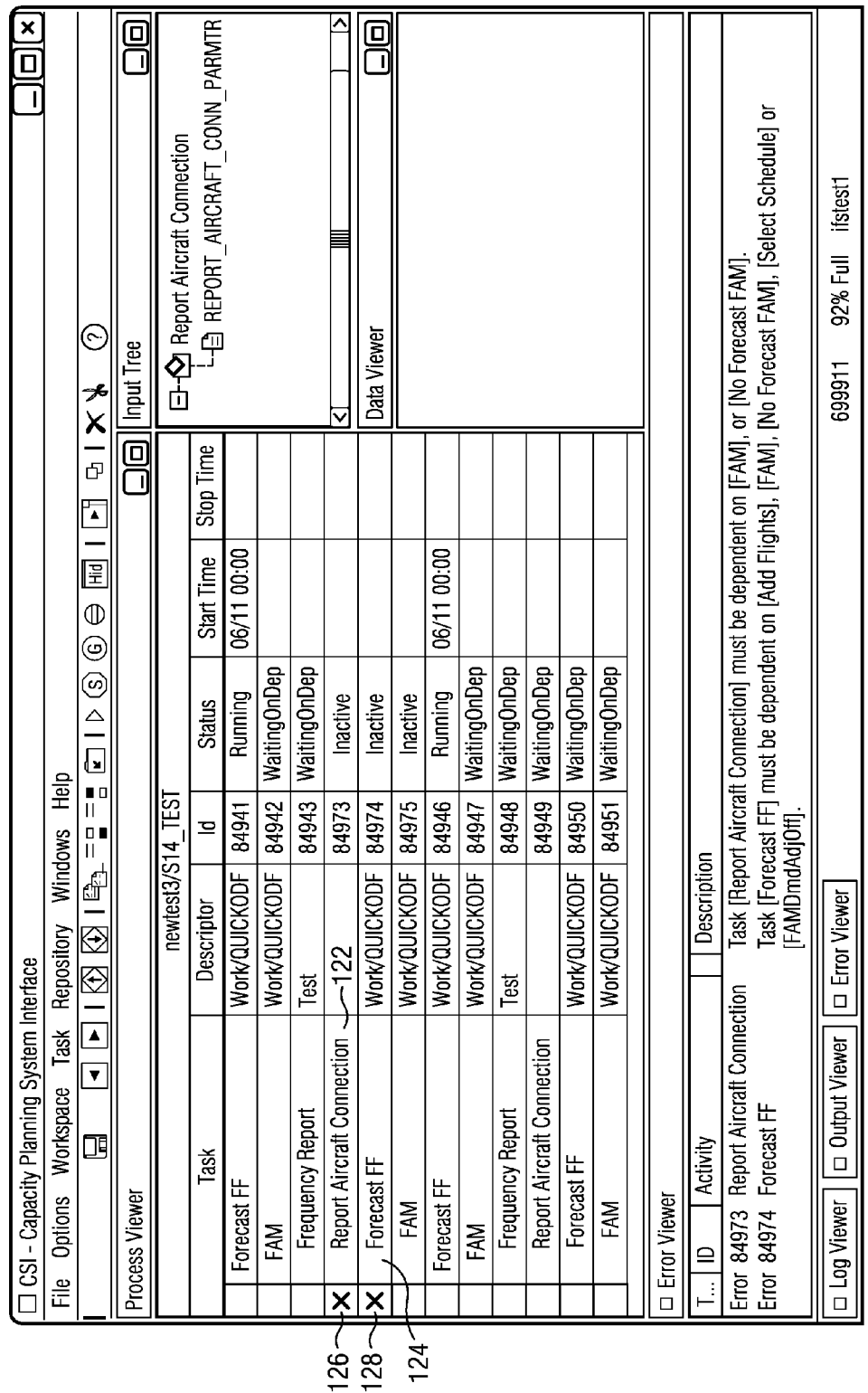

In an exemplary embodiment, as illustrated in FIG. 12 with continuing reference to FIGS. 1-11, newly added tasks 122 and 124 are indicated to have validation errors using icons 126 and 128, respectively.

Figure 13:
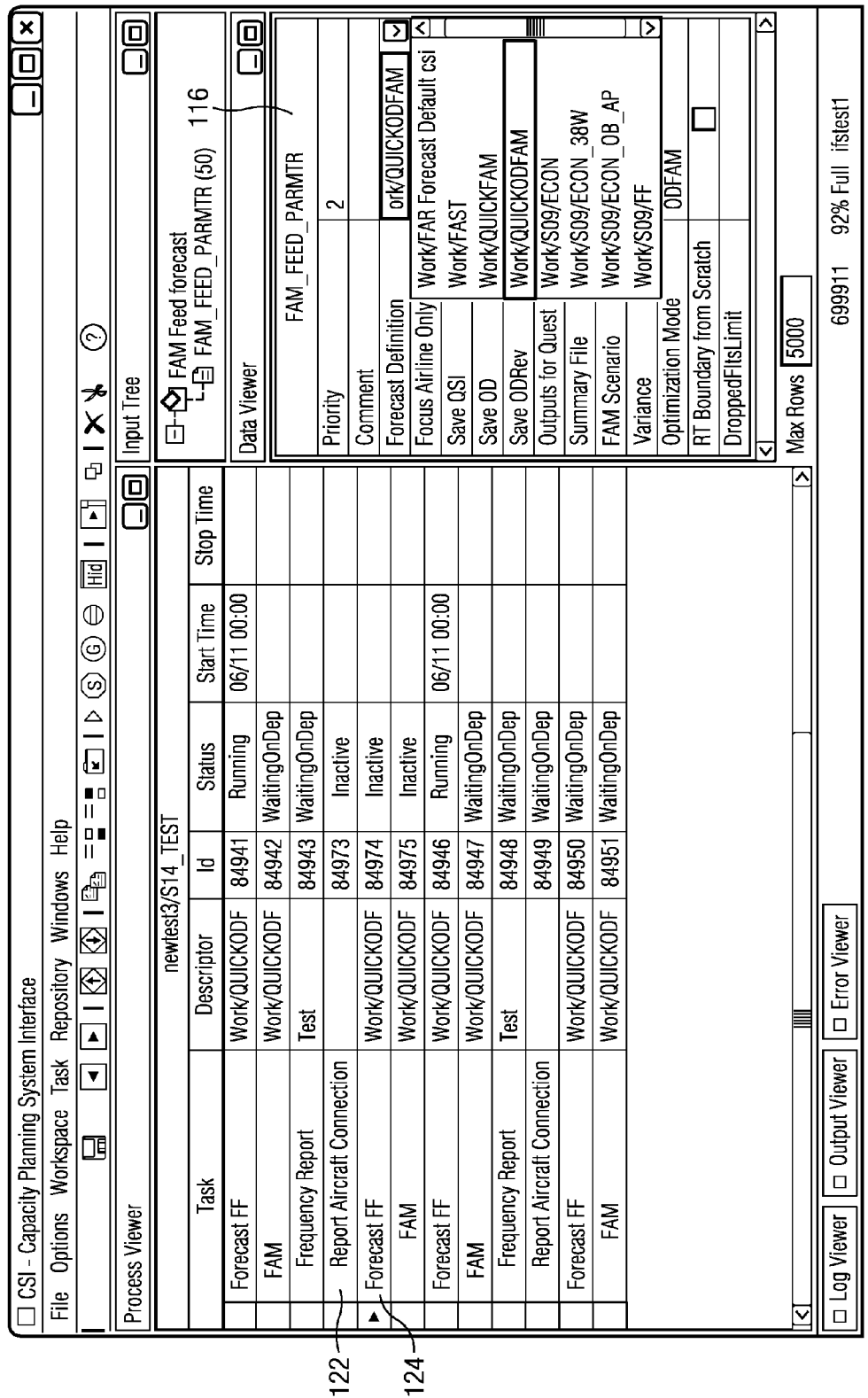
Figure 14:
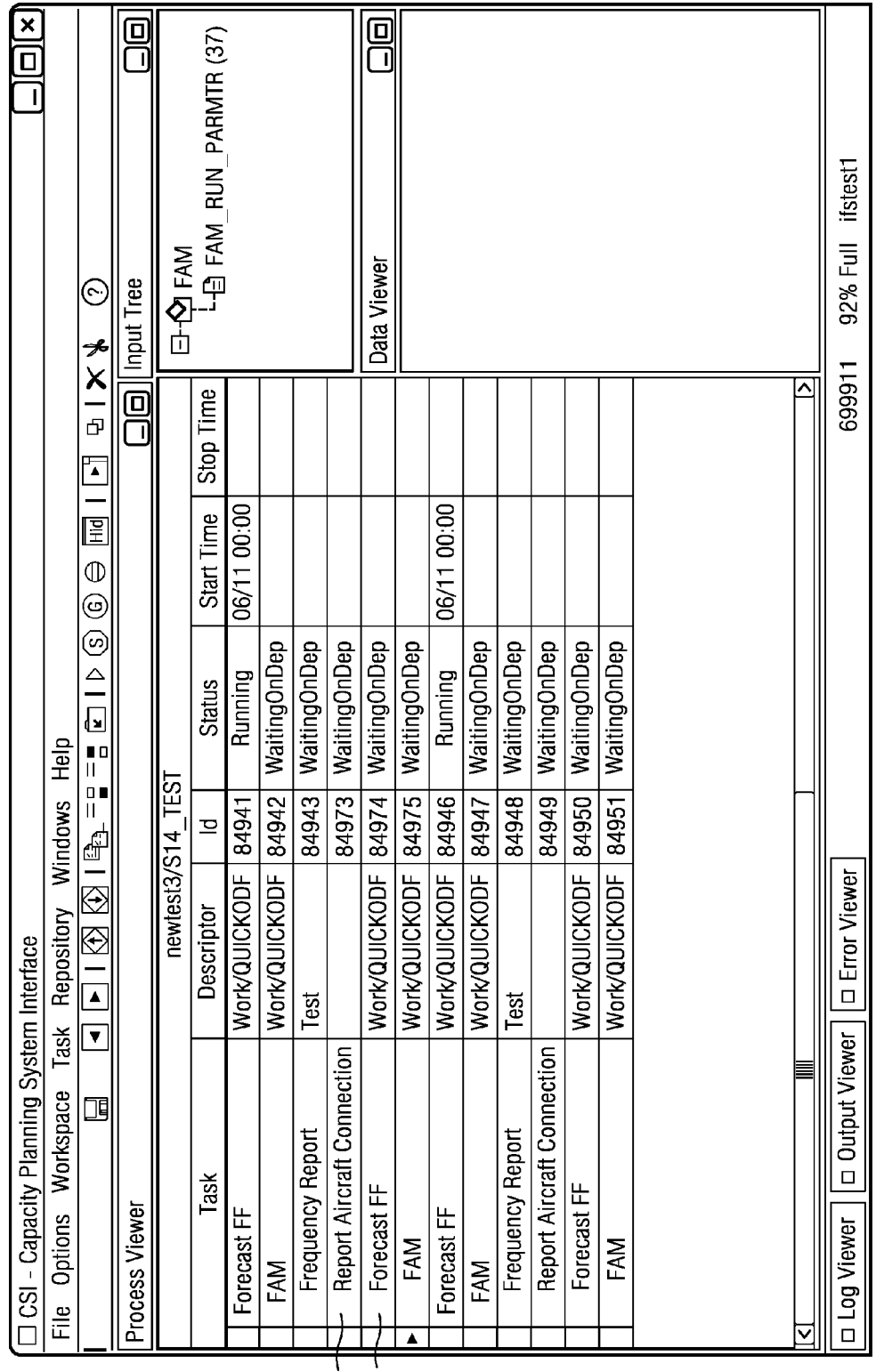

In an exemplary embodiment, as illustrated in FIGS. 13 and 14 with continuing reference to FIGS. 1-12, the tasks 122 and 124 are edited using the viewer 116 (FIG. 13) to set proper dependencies. Thus, the icons 126 and 128 are removed.

Figure 15:
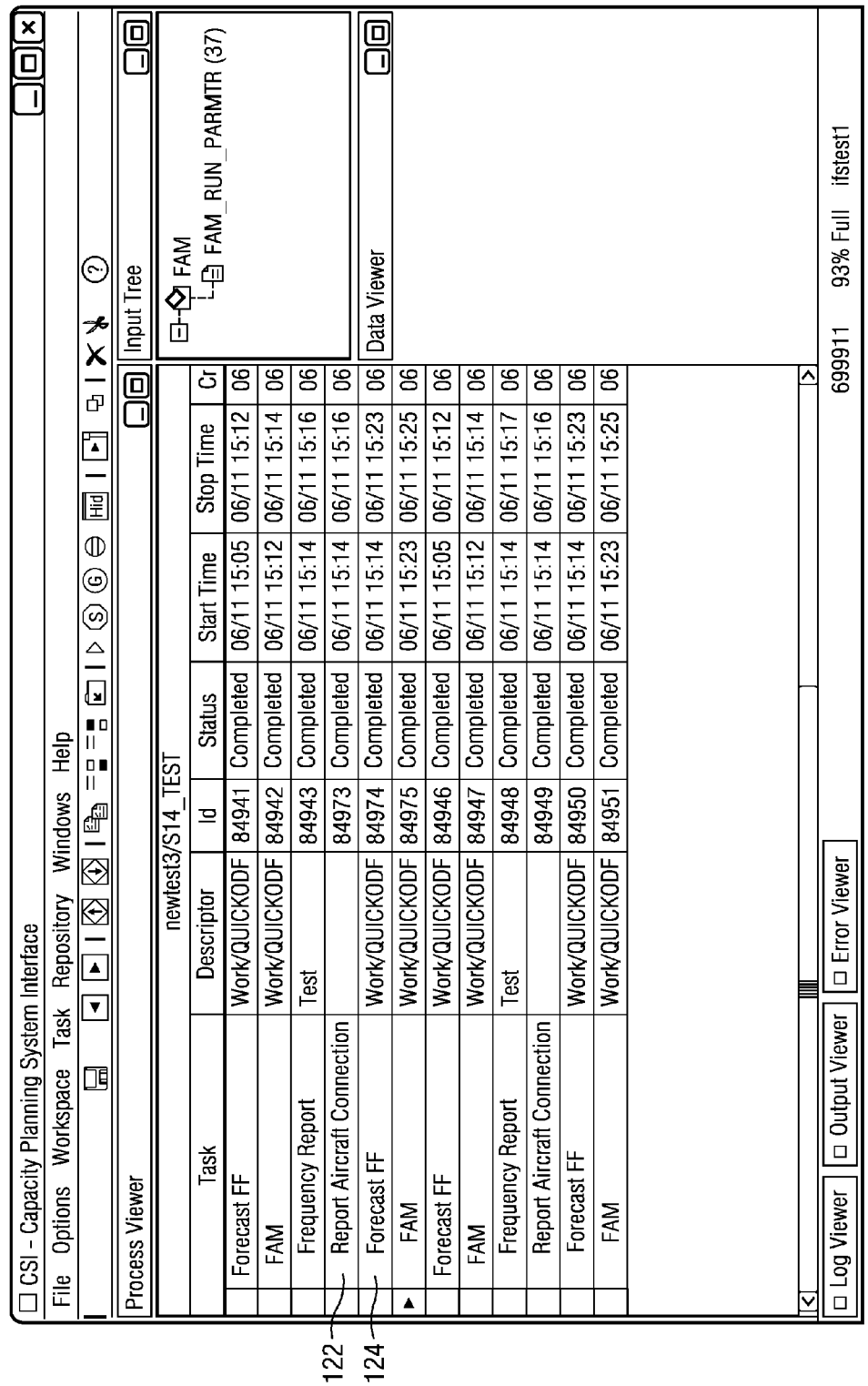

In an exemplary embodiment, as illustrated in FIG. 15 with continuing reference to FIGS. 1-14, the execution of the workflow instance is completed with the tasks 122 and 124.

In several exemplary embodiments, the workflow instances may be directed to assigning airline flights for crew members, routing aircraft, generating airline flight numbers, and assigning airline flights for equipment.

Figure 16:
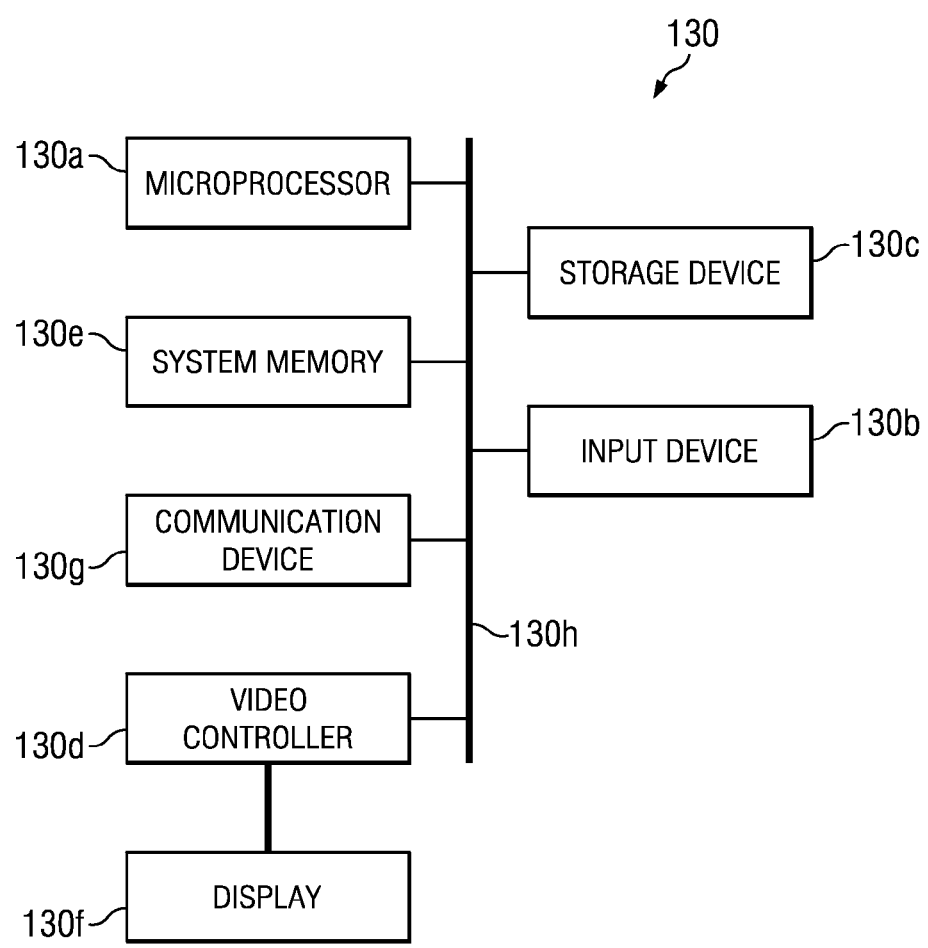
FIG. 16 is a diagrammatic illustration of a node for implementing one or more exemplary embodiments of the present disclosure, according to an exemplary embodiment.

In an exemplary embodiment, as illustrated in FIG. 16 with continuing reference to FIGS. 1-15, an illustrative node 130 for implementing one or more embodiments of one or more of the above-described networks, elements, methods and/or steps, and/or any combination thereof, is depicted. The node 130 includes a microprocessor 130a, an input device 130b, a storage device 130c, a video controller 130d, a system memory 130e, a display 130f, and a communication device 130g all interconnected by one or more buses 130h. In several exemplary embodiments, the storage device 130c may include a floppy drive, hard drive, CD-ROM, optical drive, any other form of storage device and/or any combination thereof. In several exemplary embodiments, the storage device 130c may include, and/or be capable of receiving, a floppy disk, CD-ROM, DVD-ROM, or any other form of computer-readable medium that may contain executable instructions. In several exemplary embodiments, the communication device 130g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the system 10 include at least the node 130 and/or components thereof, and/or one or more nodes that are substantially similar to the node 130 and/or components thereof. In several exemplary embodiments, one or more of the above-described components of the node 130 and/or the system 10 include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described exemplary embodiments of the system 10, the method 34, the method 84, and/or any combination thereof. In several exemplary embodiments, such a processor may include one or more of the microprocessor 130a, any processor(s) that are part of the components of the system 10, and/or any combination thereof, and such a computer readable medium may be distributed among one or more components of the system 10. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A method has been described that includes executing, using a computer system, a workflow instance based on a first structure of one or more tasks; automatically determining, using the computer system, whether the workflow instance has been modified during the execution thereof; and if the workflow instance has been modified during the execution thereof, then using the computer system to automatically continue to execute the workflow instance in accordance with the modification thereto. In an exemplary embodiment, the method includes initializing, using the computer system, a first descriptor associated with the first structure, the first descriptor including an XML file; wherein using the computer system to automatically continue to execute the workflow instance in accordance with the modification thereto includes building a second structure of one or more tasks, the second structure reflecting the modification to the workflow instance; determining whether the first and second structures are the same; and if the first and second structures are not the same, then: initializing a second descriptor associated with the second structure, the second descriptor including an XML file; and automatically continuing to execute the workflow instance based on the second structure. In an exemplary embodiment, the method includes caching, using the computer system, the first descriptor before executing the workflow instance based on the first structure; wherein using the computer system to automatically continue to execute the workflow instance in accordance with the modification thereto further includes if the first and second structures are not the same, then caching the second descriptor. In an exemplary embodiment, the method includes building, using the computer system, a first workflow in accordance with the first structure; wherein, during executing the workflow instance, a state is associated with the workflow instance before the modification thereto; and wherein using the computer system to automatically continue to execute the workflow instance in accordance with the modification thereto includes building a second structure of one or more tasks, the second structure reflecting the modification to the workflow instance; determining whether the first and second structures are the same; and if the first and second structures are not the same, then: building a second workflow in accordance with the second structure; copying the state of the workflow instance to the second workflow; and automatically continuing to execute the workflow instance based on the second workflow and thus the second structure. In an exemplary embodiment, the method includes initializing, using the computer system, a first descriptor associated with the first structure, the first descriptor including an XML file; and caching, using the computer system, the first descriptor before executing the workflow instance based on the first structure; wherein using the computer system to automatically continue to execute the workflow instance in accordance with the modification thereto further includes if the first and second structures are not the same, then: initializing a second descriptor associated with the second structure, the second descriptor including an XML file; and caching the second descriptor.

An apparatus has been described that includes one or more processors; a non-transitory computer readable medium operably coupled to the one or more processors; and a plurality of instructions stored on the computer readable medium and executable by the one or more processors, the plurality of instructions including instructions that cause the one or more processors to execute a workflow instance based on a first structure of one or more tasks; instructions that cause the one or more processors to automatically determine whether the workflow instance has been modified during the execution thereof; and instructions that, if the workflow instance has been modified during the execution thereof, cause the one or more processors to automatically continue to execute the workflow instance in accordance with the modification thereto. In an exemplary embodiment, the plurality of instructions further includes instructions that cause the one or more processors to initialize a first descriptor associated with the first structure, the first descriptor including an XML file; wherein instructions that cause the one or more processors to automatically continue to execute the workflow instance in accordance with the modification thereto include instructions that cause the one or more processors to build a second structure of one or more tasks, the second structure reflecting the modification to the workflow instance; instructions that cause the one or more processors to determine whether the first and second structures are the same; and instructions that, if the first and second structures are not the same, cause the one or more processors to: initialize a second descriptor associated with the second structure, the second descriptor including an XML file; and automatically continue to execute the workflow instance based on the second structure. In an exemplary embodiment, the plurality of instructions further includes instructions that cause the one or more processors to cache the first descriptor before executing the workflow instance based on the first structure; wherein instructions that cause the one or more processors to automatically continue to execute the workflow instance in accordance with the modification thereto further include instructions that, if the first and second structures are not the same, cause the one or more processors to cache the second descriptor. In an exemplary embodiment, the plurality of instructions further includes instructions that cause the one or more processors to build a first workflow in accordance with the first structure; wherein, during executing the workflow instance, a state is associated with the workflow instance before the modification thereto; wherein instructions that cause the one or more processors to automatically continue to execute the workflow instance in accordance with the modification thereto include instructions that cause the one or more processors to build a second structure of one or more tasks, the second structure reflecting the modification to the workflow instance; instructions that cause the one or more processors to determine whether the first and second structures are the same; and instructions that, if the first and second structures are not the same, cause the one or more processors to: build a second workflow in accordance with the second structure; copy the state of the workflow instance to the second workflow; and automatically continue to execute the workflow instance based on the second workflow and thus the second structure. In an exemplary embodiment, the plurality of instructions further includes instructions that cause the one or more processors to initialize a first descriptor associated with the first structure, the first descriptor including an XML file; and instructions that cause the one or more processors to cache the first descriptor before executing the workflow instance based on the first structure; and wherein instructions that cause the one or more processors to automatically continue to execute the workflow instance in accordance with the modification thereto further include instructions that, if the first and second structures are not the same, cause the one or more processors to: initialize a second descriptor associated with the second structure, the second descriptor including an XML file; and cache the second descriptor. In an exemplary embodiment, the apparatus includes an engine module, a database module, and a task module; wherein the one or more processors are part of one or more of the engine, database and task modules; and wherein the computer readable medium is part of one or more of the engine, database and task modules. In an exemplary embodiment, the database module includes a database, a request message queue, and a reply message queue; wherein the task module includes a task manager in communication with the database; and wherein the engine module includes a workflow engine in communication with the task manager via each of the request message queue and the reply message queue; and a structured query language (SQL) engine in communication with the database. In an exemplary embodiment, the apparatus includes an editor module in communication with the engine module, the editor module including a workflow graphical user interface (GUI) in communication with the workflow engine; an editor GUI in communication with the SQL engine; and a repository GUI in communication with the SQL engine. In an exemplary embodiment, the apparatus includes an SQL proxy adapter in communication with the SQL engine, wherein the SQL proxy adapter is adapted to receive a dataset from the editor module and interface with the SQL engine. In an exemplary embodiment, the plurality of instructions further includes instructions that cause the one or more processors to initialize a first descriptor associated with the first structure, the first descriptor including an XML file; and instructions that cause the one or more processors to cache the first descriptor before executing the workflow instance based on the first structure; wherein instructions that cause the one or more processors to automatically continue to execute the workflow instance in accordance with the modification thereto include instructions that cause the one or more processors to build a second structure of one or more tasks, the second structure reflecting the modification to the workflow instance; instructions that cause the one or more processors to determine whether the first and second structures are the same; and instructions that, if the first and second structures are not the same, cause the one or more processors to: initialize a second descriptor associated with the second structure, the second descriptor including an XML file; cache the second descriptor; and automatically continue to execute the workflow instance based on the second structure; wherein: the apparatus further includes an engine module, a database module, and a task module; the one or more processors are part of one or more of the engine, database and task modules; the computer readable medium is part of one or more of the engine, database and task modules; the database module includes a database, a request message queue, and a reply message queue; the task module includes a task manager in communication with the database; the engine module includes a workflow engine in communication with the task manager via each of the request message queue and the reply message queue, and a structured query language (SQL) engine in communication with the database; and the apparatus further includes a workflow graphical user interface (GUI) in communication with the workflow engine, an editor GUI in communication with the SQL engine, and a repository GUI in communication with the SQL engine.

A system has been described that includes means for executing a workflow instance based on a first structure of one or more tasks; means for automatically determining whether the workflow instance has been modified during the execution thereof; and means for if the workflow instance has been modified during the execution thereof, then automatically continuing to execute the workflow instance in accordance with the modification thereto. In an exemplary embodiment, the system includes means for initializing a first descriptor associated with the first structure, the first descriptor including an XML file; wherein means for automatically continuing to execute the workflow instance in accordance with the modification thereto includes means for building a second structure of one or more tasks, the second structure reflecting the modification to the workflow instance; means for determining whether the first and second structures are the same; and means for if the first and second structures are not the same, then: initializing a second descriptor associated with the second structure, the second descriptor including an XML file; and automatically continuing to execute the workflow instance based on the second structure. In an exemplary embodiment, the system includes means for caching the first descriptor before executing the workflow instance based on the first structure; wherein means for automatically continuing to execute the workflow instance in accordance with the modification thereto further includes means for if the first and second structures are not the same, then caching the second descriptor. In an exemplary embodiment, the system includes means for building a first workflow in accordance with the first structure; wherein, during executing the workflow instance, a state is associated with the workflow instance before the modification thereto; and wherein means for automatically continuing to execute the workflow instance in accordance with the modification thereto includes means for building a second structure of one or more tasks, the second structure reflecting the modification to the workflow instance; means for determining whether the first and second structures are the same; and means for if the first and second structures are not the same, then: building a second workflow in accordance with the second structure; copying the state of the workflow instance to the second workflow; and automatically continuing to execute the workflow instance based on the second workflow and thus the second structure. In an exemplary embodiment, the system includes means for initializing a first descriptor associated with the first structure, the first descriptor including an XML file; and means for caching the first descriptor before executing the workflow instance based on the first structure; wherein means for automatically continuing to execute the workflow instance in accordance with the modification thereto further includes means for if the first and second structures are not the same, then: initializing a second descriptor associated with the second structure, the second descriptor including an XML file; and caching the second descriptor.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method comprising:
defining, using a configuration file and a computer system, a first automated workflow that comprises one or more tasks, with each of the one or more tasks having a dependency status;
arranging, using the configuration file and the computer system, the one or more tasks into a first structure based on the dependency status of each of the one or more tasks;
validating the first structure using a plurality of declarative validation rules that are stored in the computer system;
initializing, using the computer system, a first descriptor associated with the first structure, the first descriptor comprising an XML file and describing the steps, states, transitions, and functionality for the first automated workflow;
caching, using the computer system, the first descriptor;
executing, using the computer system, an automated workflow instance, wherein the automated workflow instance is based on the first automated workflow and thus the first structure,
wherein the automated workflow instance is an automated business process,
wherein the automated business process comprises at least one of the following:
assigning airline flights for crew members,
routing aircraft,
generating airline flight numbers, and
assigning airline flights for equipment,
wherein the automated workflow instance is executed after caching the first descriptor, and
wherein, during executing the automated workflow instance, a state is associated with the automated workflow instance before a modification thereto;
wherein the modification comprises adding, using the configuration file, another task having a dependency status to the first automated workflow during the execution of the automated workflow instance;
automatically determining, using the computer system, that the automated workflow instance has undergone the modification during the execution of the automated workflow instance; and
using the computer system to automatically continue to execute the automated workflow instance in accordance with the modification thereto, comprising:
arranging, using the configuration file and the computer system, the one or more tasks and the another task into a second structure based on the dependency status of each of the one or more tasks and the another task;
determining that the first and second structures are not the same;
validating the second structure using the plurality of declarative validation rules that are stored in the computer system;
initializing a second descriptor associated with the second structure, the second descriptor comprising an XML file and describing the steps, states, transitions, and functionality for the second automated workflow;
caching the second descriptor;
building a second automated workflow in accordance with the second structure;
copying the state of the automated workflow instance to the second automated workflow; and
automatically continuing to execute the automated workflow instance based on the second automated workflow and thus the second structure after caching the second descriptor.

2. An apparatus comprising:
one or more processors;
a non-transitory computer readable medium operably coupled to the one or more processors; and
a plurality of instructions stored on the computer readable medium and executable by the one or more processors, the plurality of instructions comprising:
instructions that cause the one or more processors to define, using a configuration file, a first automated workflow that comprises one or more tasks, with each of the one or more tasks having a dependency status;

instructions that cause the one or more processors to arrange, using the configuration file, the one or more tasks into a first structure based on the dependency status of each of the one or more tasks;
instructions that cause the one or more processors to validate the first structure using a plurality of declarative validation rules;
instructions that cause the one or more processors to initialize a first descriptor associated with the first structure, the first descriptor comprising an XML file and describing the steps, states, transitions, and functionality for the first automated workflow;
instructions that cause the one or more processors to cache the first descriptor;
instructions that cause the one or more processors to execute an automated workflow instance, the automated workflow instance being based on the first automated workflow and thus the first structure,
  wherein the automated workflow instance is an automated business process,
  wherein the automated business process comprises at least one of the following:
    assigning airline flights for crew members,
    routing aircraft,
    generating airline flight numbers, and
    assigning airline flights for equipment,
  wherein the automated workflow instance is executed after caching the first descriptor, and
  wherein, during executing the automated workflow instance, a state is associated with the automated workflow instance before a modification thereto;
wherein the modification comprises adding, using the configuration file, another task having a dependency status to the first automated workflow during the execution of the automated workflow instance;
instructions that cause the one or more processors to automatically determine that the automated workflow instance has undergone the modification during the execution of the automated workflow instance; and
instructions that cause the one or more processors to automatically continue to execute the automated workflow instance in accordance with the modification thereto, comprising:
  instructions that cause the one or more processors to arrange, using the configuration file, the one or more tasks and the another task into a second structure based on the dependency status of each of the one or more tasks and the another task;
  instructions that cause the one or more processors to validate the second structure using the plurality of declarative validation rules;
  instructions that cause the one or more processors to determine that the first and second structures are not the same; and
  instructions that cause the one or more processors to:
    initialize a second descriptor associated with the second structure, the second descriptor comprising an XML file and describing the steps, states, transitions, and functionality for the second automated workflow;
    cache the second descriptor;
    build a second automated workflow in accordance with the second structure;
    copy the state of the automated workflow instance to the second automated workflow; and
    automatically continue to execute the automated workflow instance based on the second automated workflow and thus the second structure after the second descriptor is cached.

\* \* \* \* \*